No. 667,570. Patented Feb. 5, 1901.
S. L. PENFIELD.
STEREOGRAPHIC PROTRACTOR.
(Application filed Oct. 25, 1900.)
(No Model.) 2 Sheets—Sheet 1.

No. 667,570. Patented Feb. 5, 1901.
S. L. PENFIELD.
STEREOGRAPHIC PROTRACTOR.
(Application filed Oct. 25, 1900.)

(No Model.) 2 Sheets—Sheet 2.

UNITED STATES PATENT OFFICE.

SAMUEL LEWIS PENFIELD, OF NEW HAVEN, CONNECTICUT.

STEREOGRAPHIC PROTRACTOR.

SPECIFICATION forming part of Letters Patent No. 667,570, dated February 5, 1901.

Application filed October 25, 1900. Serial No. 34,248. (No model.)

*To all whom it may concern:*

Be it known that I, SAMUEL LEWIS PENFIELD, of New Haven, in the county of New Haven and State of Connecticut, have invented a new Improvement in Stereographic Protractors; and I do hereby declare the following, when taken in connection with the accompanying drawings and the letters of reference marked thereon, to be a full, clear, and exact description of the same, and which said drawings constitute part of this specification, and represent, in—

Figure 1:
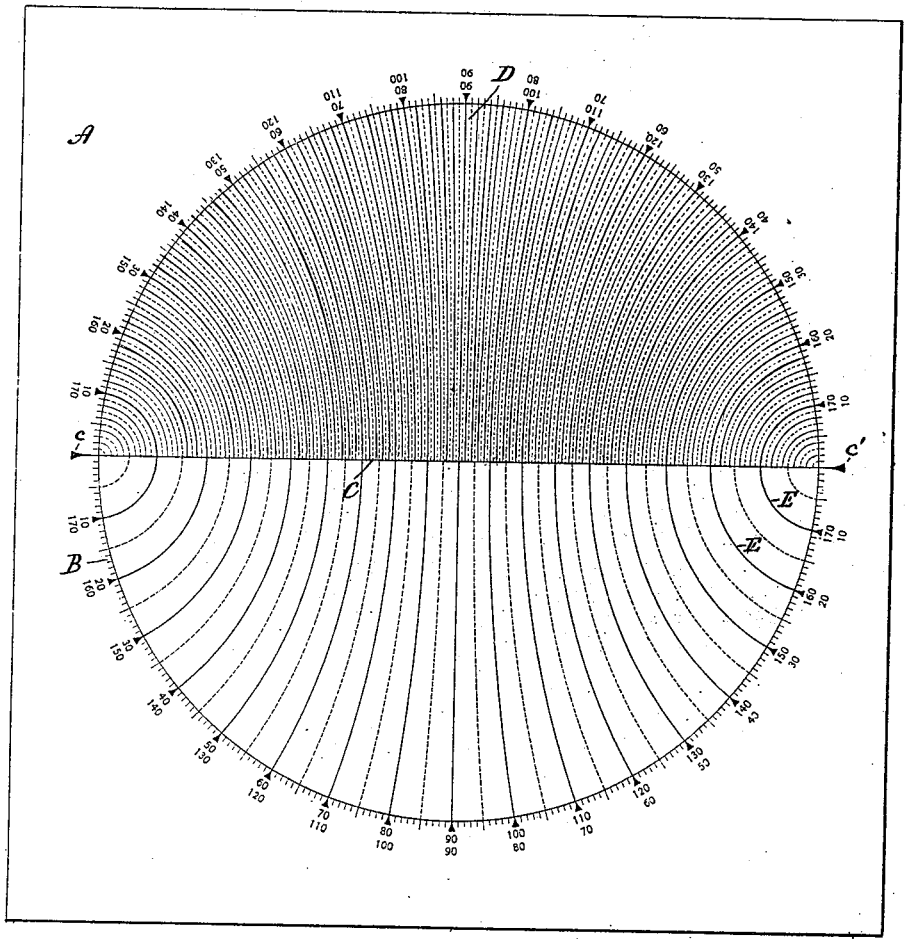
Figure 2:
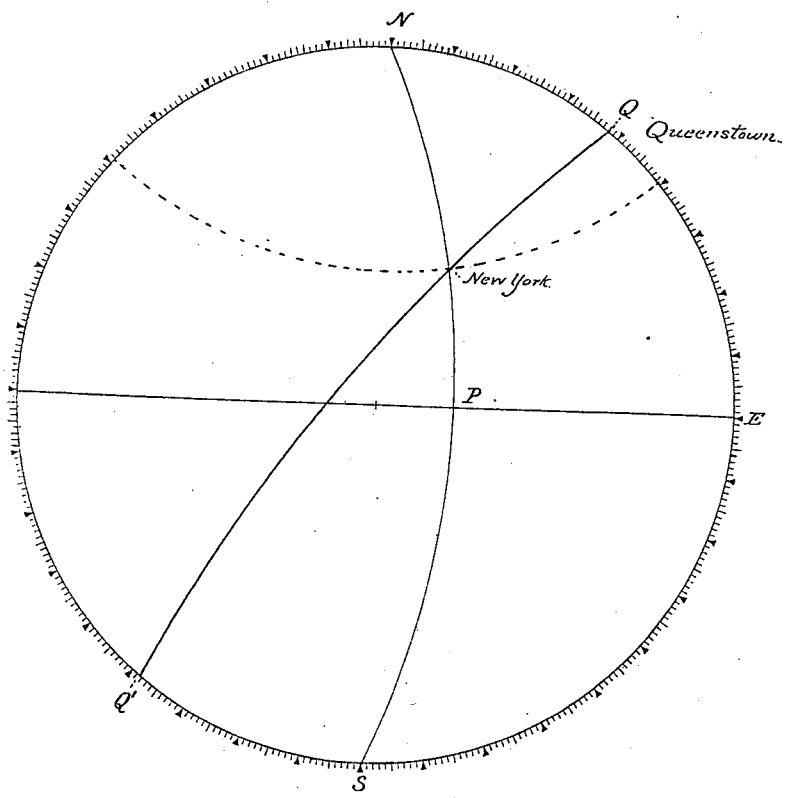

Figure 1, a plan view of one form which my improved stereographic protractor may assume; Fig. 2, a graduated circle drawn to the same scale and illustrating such a circle as may be used in conjunction with my protractor.

My invention relates to an improved stereographic protractor, the object being to produce an extremely simple, cheap, and convenient instrument for the ready solution of problems in spherical trigonometry as they may be encountered in the study or teaching of that particular branch of mathematics or as applied to special subjects—such as crystallography, astronomy, navigation, &c.—to which the principles of spherical trigonometry are applied.

My improved device is particularly adapted for use in high schools and colleges, where practical application of the uses of spherical trigonometry are made in the course of instruction of students in science.

With these ends in view my invention consists in a stereographic protractor consisting of a transparent or semitransparent plate or sheet having imposed upon it a series of stereographically-projected arcs of circles.

My invention further consists in a stereographic protractor having certain other details, as will be hereinafter described, and pointed out in the claims.

Before proceeding to a description of the instrument it may be stated that in a stereographic projection any given point or line on the surface of a sphere is represented as projected upon a flat surface passing through the center of the sphere, the said surface forming the plane of projection. The lines of projection all run to a point or pole on the surface of the sphere, the said pole being at right angles to the plane of projection.

My improved instrument in the form chosen for illustration consists of a rectangular plate or sheet A, of transparent celluloid or other transparent or semitransparent material, upon which certain lines and figures are imposed, either by printing, engraving, or in any other suitable manner. The flat surface of this plate represents the plane of projection which is to be conceived as passing through the center of a sphere of certain diameter, which in this case is fourteen centimeters.

In further explanation of what I mean by "plane of projection" let it be imagined that we have a sphere of fourteen centimeters in diameter, and therefore corresponding to the diameter of the graduated circle B of my improved stereographic protractor. Let it be further imagined that this supposed sphere has an equator on it and that the equator is divided into degrees. Now a plane passing through the said equator and which may extend beyond the sphere will be the "plane of projection" within the meaning of that term as I have used it. The pole or point toward which everything is projected will be the south pole of the sphere, provided the plane of projection is the plane of the equator. The said lines upon the plate A comprise the graduated circle B, (corresponding to the equator of a fourteen-centimeter sphere,) divided into degrees running from zero to one hundred and eighty and numbered from "10" to "170" in opposite directions for convenience of reading, though it would be sufficient to number them in one direction only. Upon the circle B, I impose a line C, joining the zero and one-hundred-and-eighty degree points upon the graduated circle and having its ends slightly enlarged, as at $c$ $c'$, for convenience in setting the zero and one-hundred-and-eighty degree points of the graduation at any desired fixed points. This line C, it may be stated, representes a stereographically-projected great circle. I also impose upon the circle a line D, joining the ninety-degree points upon the graduated circle and of course centrally intersecting the line C, already mentioned. This line D also represents a stereographically-projected great circle. I also impose upon the circle a progressive series of stereographically-projected arcs of small circles E of constantly-increasing radii and secured by calculations based upon known principles of stereographic projection not requiring rehearsal here because well known to those familiar with the subject of spherical trigonometry. One half of the graduated circle is divided into spaces of ten degrees by such arcs of circles drawn in full lines and into spaces of five degrees by such arcs of circles drawn in broken lines, while the other half of the circle is divided into spaces of ten degrees by such arcs of circles drawn in full lines and into spaces of one degree by alternating arcs of circles drawn in light full lines and light broken lines. This method of indicating even degrees by full lines and odd degrees by broken lines has been adopted merely as a matter of convenience, for within a fourteen-centimeter circle the lines are necessarily crowded together, and it makes the use of the protractor somewhat simpler to have them thus differentiated. The calculations employed for securing the said arcs of circles take into account the diameter of the graduated circle, which, as aforesaid, is fourteen centimeters. It follows from this that my improved stereographic protractor can only be used in connection with some scheme of projection founded upon a corresponding scale. In other words, a protractor the graduated circle of which has a diameter of fourteen centimeters can only be employed in conjunction with a stereographic projection made upon a circle of fourteen centimeters diameter. If I wish to employ a larger or a smaller scale for the projection, it would be necessary to construct a new protractor corresponding to the diameter of the circle adopted.

An engraved circle of fourteen centimeters diameter intended to be used in connection with my stereographic protractor, Fig. 1, is shown by Fig. 2 of the drawings. This circle may be printed upon sheets of paper supplied for use in conjunction with my improved protractor, or it may be drawn by the use of the ordinary tools.

The practical use of my improved instrument will be sufficiently demonstrated by a single problem in navigation. This problem may be stated as follows: Required the distance in degrees between Queenstown, latitude fifty-one degrees fifty minutes north, longitude eight degrees fifteen minutes west, and New York, latitude forty degrees forty minutes north, longitude seventy-four degrees west. This problem may be solved by the use of my protractor in different ways; but perhaps the simplest procedure for the solution of it is as follows: The plane of the projection is chosen as a north and south plane, corresponding to the north and south meridian passing through Queenstown, this plane being eight degrees and fifteen minutes west of the meridian of Greenwich. Queenstown is easily located at Q, fifty degrees fifty minutes north of east, which represents the intersection of the meridian with the equator. The circular arc N P S on Fig. 2 is a stereographically-projected north and south meridian passing through New York, seventy-four degrees west of Greenwich, and hence sixty-five degrees forty-five minutes west of the meridian of Queenstown. The meridian N P S is easily plotted by means of suitable scales, and the exact location of New York—forty degrees forty-one minutes north—is easily determined. It is not necessary to draw the arc Q Q', which represents a great circle passing through Queenstown and New York and terminating at Q' opposite Queenstown. Now by applying my protractor so that its zero and one-hundred-and-eighty degree points correspond to Q (Queenstown) and Q' the distance in degrees between Queenstown and New York can be determined directly as a little over forty-five degrees. By actual measurement with my protractor it was found to be forty-five degrees fifteen minutes. By calculation the distance is forty-five degrees eleven minutes. In measuring this distance with my protractor it will be understood, of course, that after the points Queenstown and New York are located on the graduated circle shown by Fig. 2 of the drawings the protractor is laid over the said circle, so as to register therewith, the zero points being at Q and Q', after which the solution of the problem may be made by following the stereographically-projected arcs of circles on my improved instrument in their relations to the points Queenstown and New York established on the circle of Fig. 2. It will be seen from this illustration that the distance in degrees between any two points of a stereographic projection can be measured directly and without an elaborate series of computations by my improved instrument, provided that the stereographic projection is plotted on a scale corresponding to the diameter of the protractor.

I do not limit myself to any set size for the protractor nor to minor details as to just how it is to be printed or engraved. It is preferably printed on transparent celluloid or on semitransparent material, such as tracing cloth or paper. It is also apparent that while a protractor giving a full circle may be more convenient a semicircular protractor would answer every requirement. I would therefore have it understood that I do not limit myself to the exact details herein shown and described, but hold myself at liberty to make such alterations as fairly fall within the spirit and scope of my invention.

Having fully described my invention, what I claim as new, and desire to secure by Letters Patent, is—

1. As a new article of manufacture, a stereographic protractor for use in the solution of problems in spherical trigonometry, the said article consisting of a transparent or semitransparent plate having imposed upon it a progressive series of stereographically-projected arcs of circles, whereby the plate may be superposed upon another surface and its imposed lines read in conjunction therewith.

2. As a new article of manufacture, a stereographic protractor for use in the solution of problems in spherical trigonometry, the said article consisting of a transparent or semitransparent plate having imposed upon it a progressive series of stereographically-projected arcs of small circles intersecting a stereographically-projected arc of a great circle, whereby the plate may be superposed upon another surface and its imposed lines read in conjunction therewith.

3. As a new article of manufacture, a stereographic protractor consisting of a transparent or semitransparent plate or sheet provided with a graduated circle or a part of such a circle, a line imposed upon the circle and joining the zero and one-hundred-and-eighty degree points thereof, a line imposed upon the circle at a right angle to the said zero to one-hundred-and-eighty degree line, the center of which it intersects, and a series of stereographically-projected arcs of circles imposed upon the graduated circle, and intersecting the said zero to one-hundred-and-eighty degree line.

In testimony whereof I have signed this specification in the presence of two subscribing witnesses.

SAMUEL LEWIS PENFIELD.

Witnesses:
FREDERIC C. EARLE,
GEORGE D. SEYMOUR.